May 30, 1950 E. VON MÜLINEN 2,509,850
SUPERVISORY CONTROL SYSTEM
Filed April 29, 1946 4 Sheets-Sheet 1

Inventor:
Egbert von Mülinen,
By Pierce & Scheffler,
Attorneys.

May 30, 1950  E. VON MÜLINEN  2,509,850
SUPERVISORY CONTROL SYSTEM
Filed April 29, 1946  4 Sheets-Sheet 4

Inventor:
Egbert von Mülinen,
By
Pierce & Scheffler,
Attorneys.

Patented May 30, 1950

2,509,850

UNITED STATES PATENT OFFICE 2,509,850

SUPERVISORY CONTROL SYSTEM

Egbert von Müllnen, Ennetbaden, Switzerland

Application April 29, 1946, Serial No. 665,881
In Switzerland May 16, 1945

6 Claims. (Cl. 177—311)

This invention relates to systems of supervisory control and more particularly to such systems of the comparison type.

An object of the invention is to provide a novel system of the character described wherein actual travel, progress, speed, advancement, production, position etc. of one or a plurality of interrelated operating components are automatically compared with a preselected program of operation for the components as related to time and any deviation therebetween is automatically signalled to a supervisor.

Another object is to provide a novel supervisory system wherein an observer at a central station may view the actual operating condition of a plurality of components such as working machines and the like as compared with a prearranged operating plan according to time.

Yet another object is to provide a novel panelboard system whereby an operator may, by means of light signals of different characteristics such as lights of different colors, flickering lights at different rates of flicker, etc., be informed as to the actual operating condition of one or a plurality of component machines as related to a predetermined desired program of operation.

A more specific object is to provide a novel supervisory system wherein the actual rate of production of a working machine is compared with a preplanned rate of production by means of switches advanced, respectively, with machine production and time, the switches being arranged in a signal circuit in such manner that a signal of one characteristic is conveyed to a supervisor when machine production is in step with planned production while a signal of a different characteristic is conveyed to the supervisor when actual production of the machine either lags or leads the production plan.

These and other objects of the invention will become more apparent from the following detailed description of the invention as applied to different types of operating components and accompanied by corresponding drawings.

Figure 1:
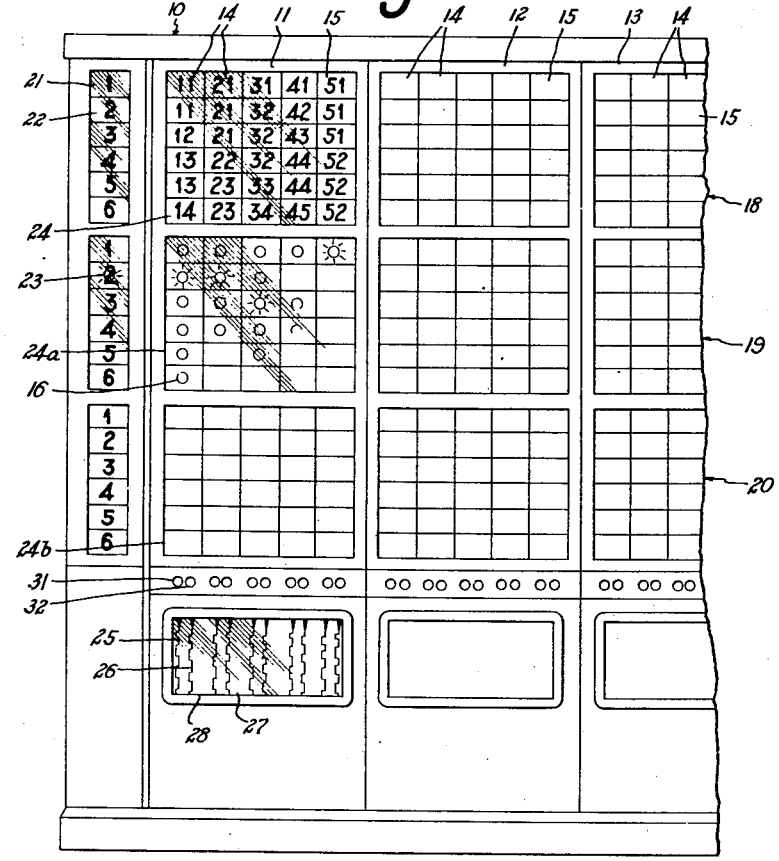
Figure 6:
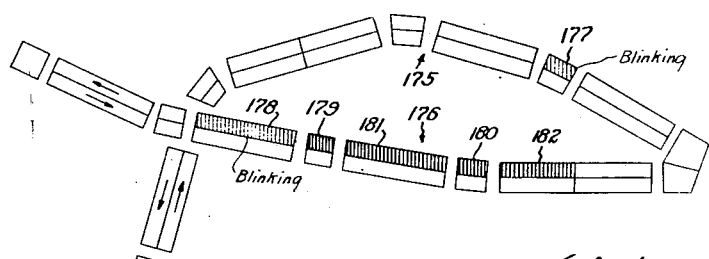
Figure 2:
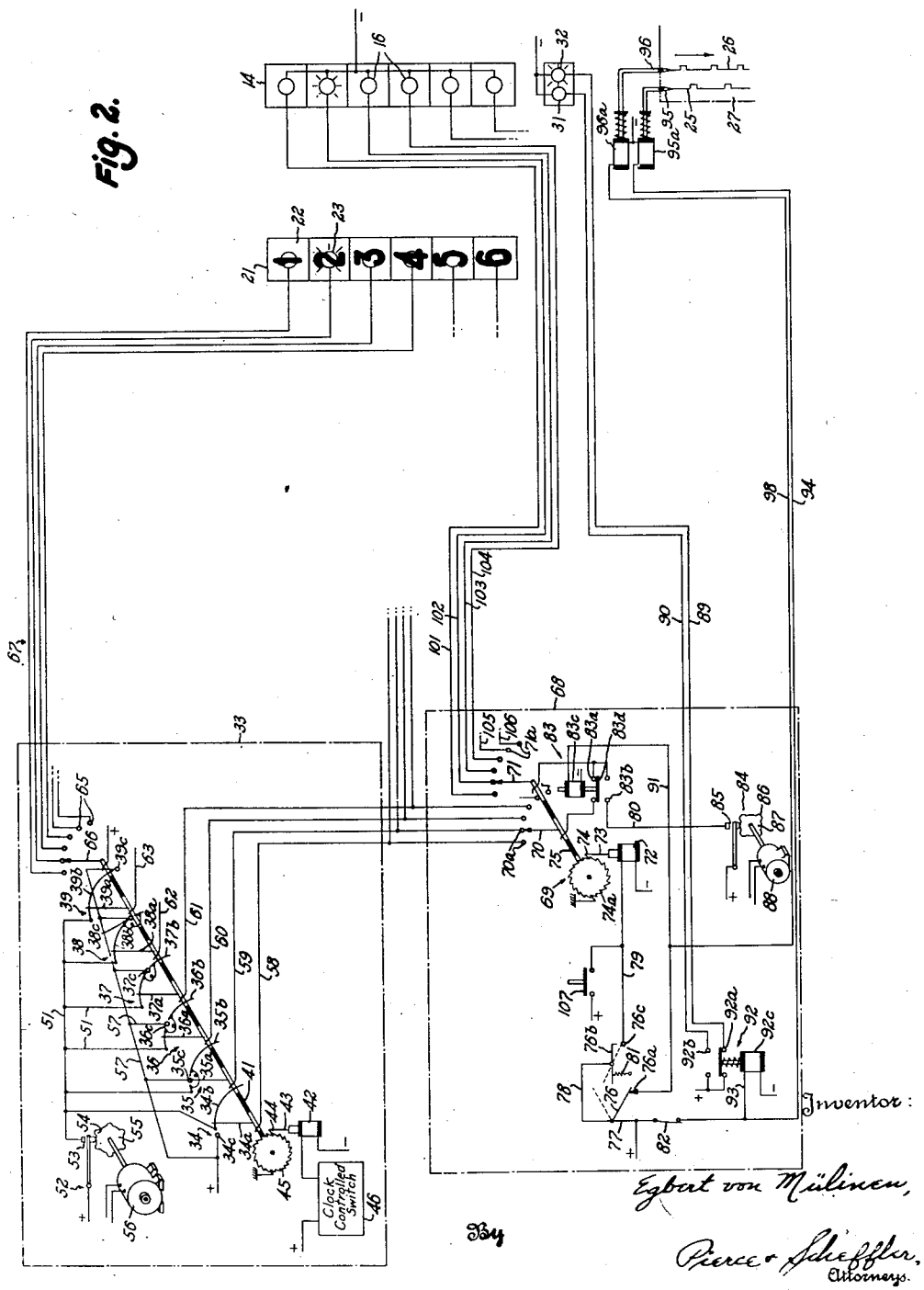
Figure 3:
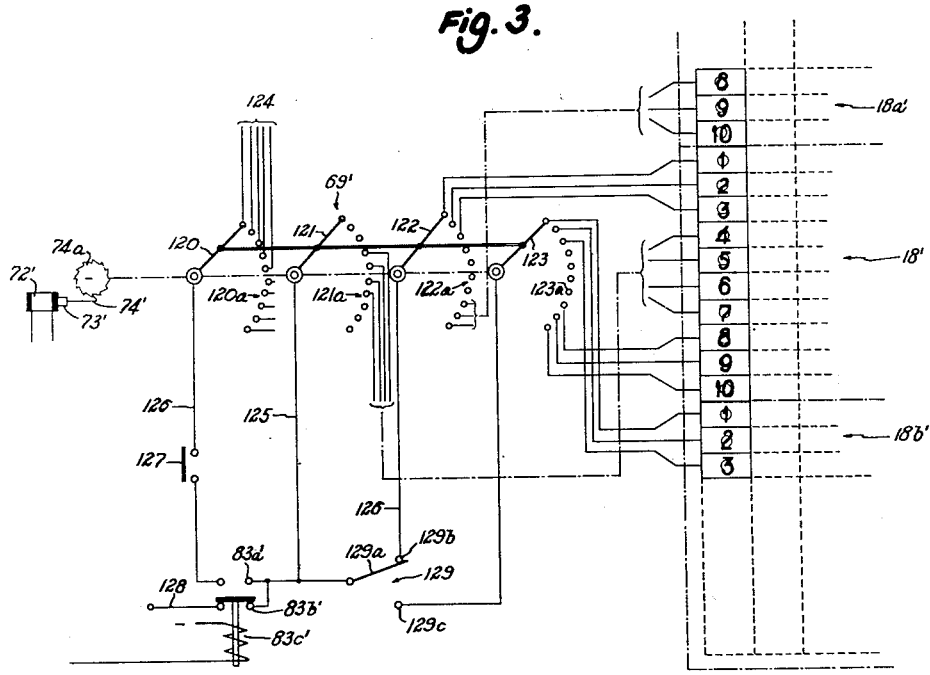
Figure 4:
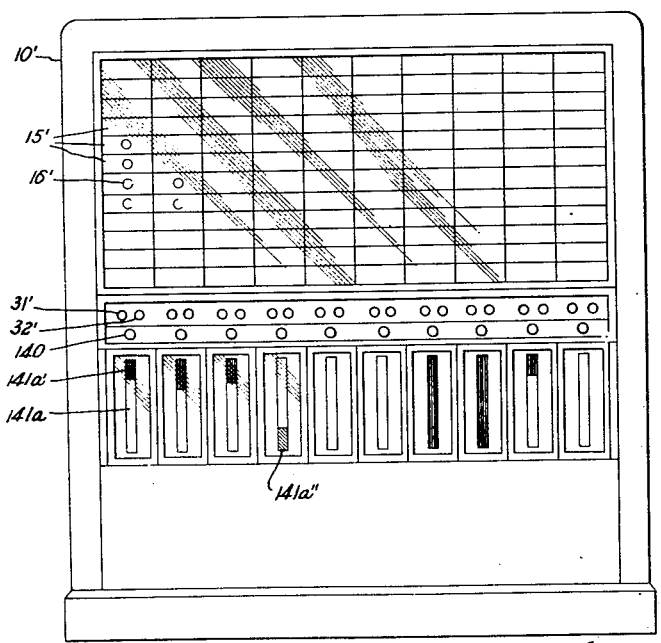
Figure 5:
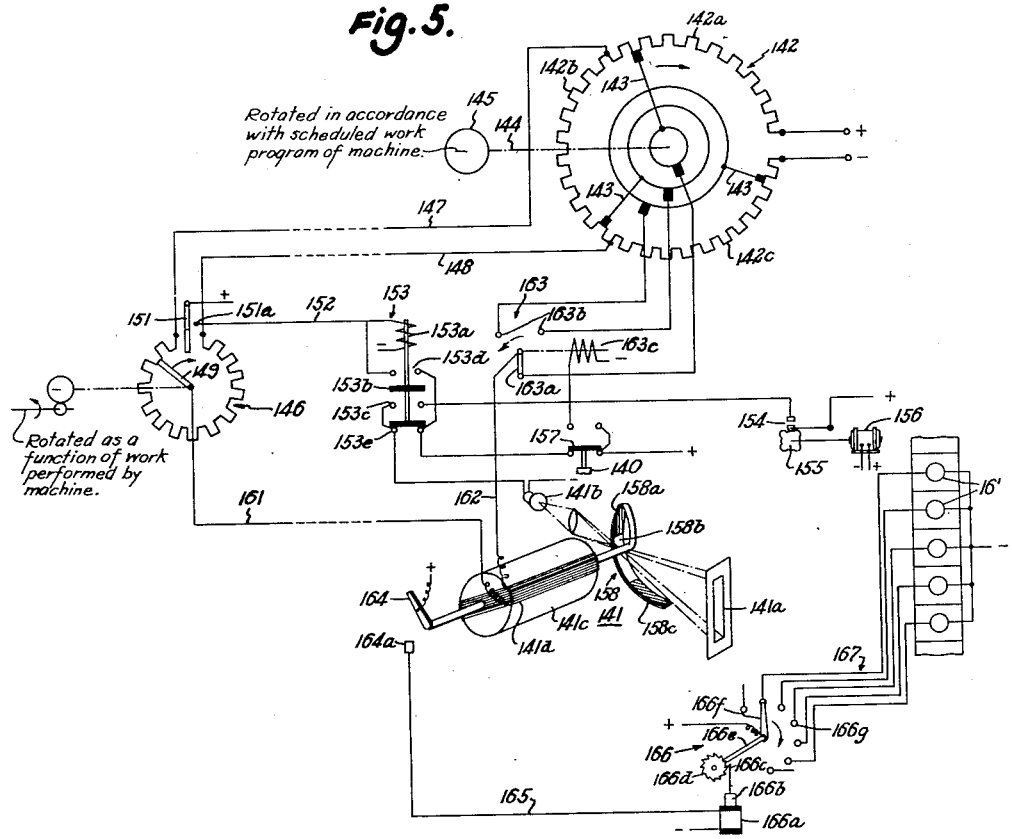
Figure 7:
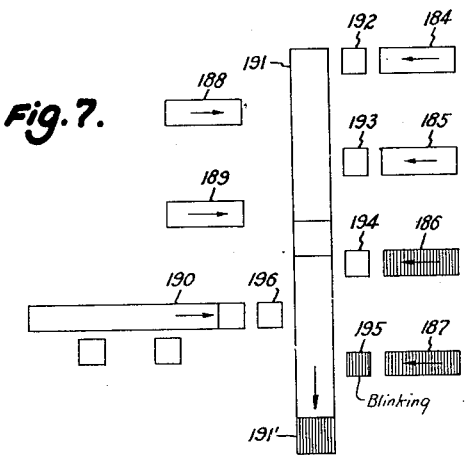

In the drawings, Fig. 1 is a view in elevation of a portion of a panelboard on which the operator may view the signals, Fig. 2 is an electrical schematic of the switches and circuits by which the desired comparison may be made for one of a plurality of working machines whose production characteristics are viewed on the panelboard on Fig. 1; Fig. 3 shows a modified form of the switching arrangement of Fig. 2; Fig. 5 illustrates a somewhat different form of switching; Fig. 4 is an elevation of the type of panelboard to be used with the switching system of Fig. 5; Fig. 6 is a diagrammatic view of a subway system incorporating the invention; while Fig. 7 is also a diagrammatic view of the invention as applied to a plant using the assembly line arrangement for manufacture.

In factories in which a number of working machines especially machine tools are set up, or which employ devices for assembly line manufacture for making certain products, it is most desirable that production for the machines be planned in advance so that all component parts produced by the machines will be available in sufficient quantities for subsequent assembly of the final product. Production planning alone will not suffice however and must be augmented by some suitable system for supervising actual production of each of the machines to determine how each is operating in relation to the overall production plan.

In the embodiments of the invention as illustrated by Figs. 1–5, supervision over the machines is maintained by use of a suitably located panelboard with which all of the machines are connected in such manner that actual production of each machine as compared with the scheduled production of such machine is indicated on the board by means of light signals. The arrangement is such that a light of one characteristic will indicate to the supervisor that a particular machine is producing at the preplanned rate while lights of different characteristics will indicate that the machine is either lagging or leading the scheduled plan for production. The electrical circuits and operating components thereof include a switching device for each of the machines which advances progressively as a function of the production of the machine, a master switching device which progresses in accordance with the planned production scheduled for such machine, means for continuously comparing the positions of the two switching devices for ascertaining any deviation therebetween, and means for operating the indicating lights on the panel in such a manner that the characteristic of the light is indicative of the production characteristics of the machine.

Referring now to the drawings and particularly to Figs. 1 and 2, a typical panelboard 10 for supervising a plurality of working machines is shown in Fig. 1. This board is constituted by three sections 11, 12 and 13 placed side by side. The front surface of each of the sections 11, 12 and 13 is lined vertically to provide five columns 14, each of which represents a working machine in the plant. The surface of each section is also lined horizontally to divide the columns 14 into rectangular spaces 15 that are grouped into three sub-sections 18, 19 and 20. Each sub-section contains six spaces that are each representative of a period of machine production. Thus each of the sub-sections may denote a work week of six days for five machines. The spaces 15 of sub-sections 19 of the panelboard are transparent and each is arranged to be illuminated from the rear by means of lamps 16 suitably supported on the board and properly shielded from each other. The areas of the other sub-sections 18 and 20 are not illuminated.

At the left side of the panelboard 10, the front surface is lined to provide another vertical column 21 and this column is also divided horizontally into rectangular spaces 22 which are grouped into three sections of six spaces each to denote the several work days of each week. The spaces of each section of column 21 may be numbered from one to six as shown and those of the middle section are transparent and are arranged to be illuminated from the rear by lamps 23.

In a manner to be more fully explained hereinafter, the lamps 16 in each of the columns 14 of the middle sections 19 are arranged to be illuminated in succession by means of switches actuated by the machines as a function of their production; and the lamps 23 in the middle section of the "time" column 21 are illuminated in succession by switches actuated in accordance with time. These switches are so interrelated that the particular characteristic of illumination of lamps 16 depends upon the relation between the amount of work actually performed by the machine during a period of time and the work scheduled in advance for such machine for such period as determined by the desired over-all production program for all machines in the plant. Details of one suitable switching arrangement for producing this result are to be found in Fig. 2 and these will be described later in detail.

As an example of a typical operating condition of several machines, the lamp 23 behind the space numeralled "2" of the middle section of column 21 is lighted to indicate that the production program is in the second day of the week. If production of each of the fifteen machines (there may be more or less) is proceeding at the rate called for by the program, the switching devices on the machines will be in such position that the lamps 16 will be lighted in a row across the middle section 19 at the same level as lighted lamp 23.

In actual factory operation however, this optimum condition cannot always be maintained. Some machines might be working in advance of scheduled production while others might be lagging considerably in output. Thus, for example, the third machine (reading from left to right in the columns 14) might be working at a rate in advance of scheduled production and this would be indicated to the supervisor by a blinking lamp in the third space of the third row of the middle section. In a similar manner, a lag in production by the fifth machine would be indicated by a blinking lamp in the first space of the fifth row of this section. A lamp in the second space of the first row might blink at a different rate to indicate that number one machine has already completed its production assigned for the first day of the week and is preparing for that of the second day.

The illuminated sections 19 of panelboard 10 thus serve to keep the supervisor informed as to the production of each machine for any current week. Unilluminated sections 18 and 20 of the board are not necessary if this is all the information that the supervisor desires. However these latter two sections are preferably included in order that production data may be posted over a three week period covering the past, current and coming weeks. For this purpose, interchangeable transparent glass plates 24, 24a and 24b are provided and these are adapted to be placed on board 10 over a week's section of five machines. The surface of each plate is lined off into thirty spaces corresponding to the spaces 15 over which the plate lies. Plate 24 over section 18 as shown in the drawing has been inscribed with production data for the past week from which it can be seen that the article designated by the number "11" was made by the first machine in the first two days of the past week, the article designated by the number "12" was made in the third day of that week by this machine, etc.

Plate 24a over section 19 would be inscribed with planned production data for the current week while plate 24b over section 20 would be inscribed with the plan of production for the coming week. At the end of the week, the plates would be shifted around. Plate 24 would be replaced by plate 24a; plate 24b would be moved up to the place formerly occupied by plate 24a; and plate 24 would be put in the place previously occupied by plate 24b. The inscriptions on plate 24 would then be "erased" and the production plan for the machines for the next new week re-inscribed thereon.

If desired, a permanent record of the operation of each machine may be obtained at the supervisory control station by means of recording instruments which trace two records 25, 26 on a moving chart 27 for each machine. The chart 27 is viewed through a window 28 in the control panel. One record relates to production data while the other relates to starting and stopping of the machines. By special recording pens, the regularity of the course of production can be recorded. The records so made by all the recording pens can be used very well for making wage-payment calculations.

The panelboard 10 may also be provided with a set of two signal lamps 31, 32 for each machine. One lamp of each set would be lit while the machine was out of operation and the others while the machine was in operation.

Reference is now made to Fig. 2 which shows a suitable circuit arrangement for setting up on panelboard 10 the light signals of various characteristics dependent upon the relation between actual and pre-planned production for a machine.

It has already been stated that the lights of different characteristic on the panelboard 10 are indicative to the supervisor of the production characteristic of each machine in the plant under supervision and that the particular light characteristic displayed is determined by the relation between two switching devices, one of which is actuated by the machine as a function of its production and the other by a timing device set up in accordance wtih the production plan for such machine.

Thus referring now to Fig. 2, the master switching device actuated as a function of planned production for the six illustrated time periods is shown generally by the parts within the block 33, and is comprised of six switch sections 34—39.

Each section of the switch, such as section 34 for example, includes a pivoted arm 34a mounted on a shaft 41 and as the latter rotates, arm 34a wipes over an arcuate path for contact with either an elongated arcuate segment 34b or a "point" contact 34c, both of which are stationary. The other switch arms 35a—39a move with arm 34a as the shaft 41 rotates. Rotation of shaft 41 is effected in steps of equal angular displacement by means of an electromagnetic motor comprising solenoid winding 42 and armature 43 having a pawl 44 that engages a ratchet wheel 45 which is suitably keyed to shaft 41. Energization of winding 42 occurs periodically as a function of time determined by suitable means such as clockwork controlled switch mechanism of conventional construction and therefore indicated generally by the block symbol 46.

The stepped rotation of shaft 41 is so arranged that with each movement thereof, the arms of the several switch sections 34—39 engage their "point" contacts in succession. Thus, for example, during one time period, arm 35a engages contact 35c; when the end of that period occurs, shaft 41 rotates to bring arm 36a into engagement with "point" contact 36c, and so forth. It should be noted that the point and segmental contact elements of the switch sections 34—39 are so staggered angularly that the switch arms engage the point contact element at different angular positions and at such positions only. At all other angular positions of these arms, they make contact with a portion of the arcuate segmental contact element. Such arrangement requires the four inside segmental contacts 35b—38b to be split or interrupted as shown with their respective "point" contacts 35c—38c located in the space between the split sections, while the outer segmental contacts 34b and 39b are continuous for their entire length.

The arcuate contact segments 34b—39b are connected by conductors 51 to the positive side of a source of current designated by conventional symbols through a current interrupter device 52 which includes contacts 53 opened and closed at a comparatively rapid rate by projections 54 on a disc 55 that is rotated by motor 56.

The "point" contacts 34c—39c are connected by conductors 57 to the positive side of a source of "steady" or uninterrupted current.

It will now be evident that as the several arms 34a—39a come successively into engagement with their associated "point" contact elements 34c—39c, "steady" power will be put on outgoing lines 58—63 connected to these arms. At all other times, i. e. when arms 34a—39a engage their respective arcuate contacts 34b—39b rapidly interrupted or "flickering" power will be put out to lines 58—63.

Also associated with the master switch mechanism is still another set of stationary contacts 65 which are adapted to be wiped in succession by a contactor arm 66 which is connected to the positive side of a power source. The several contacts 65 have the same angular spacing as contacts 34c—39c and function to pass current in succession over lines 67 to the vertical bank of "time period" lamps 23 previously described.

The switching apparatus that is actuated as a function of actual production of the machine, as distinguished from its planned production, is contained generally within the block 68 and comprises a step relay 69 that includes a pair of coupled arms 70, 71 which are progressively stepped together over their respectively associated fixed sets of contacts 70a, 71a. Contactor arms 70, 71 are stepped up from one contact to another each time that solenoid winding 72 is energized, the armature element 73 of the solenoid being mechanically linked to coupled arms 70, 71 by pawl 74, ratchet wheel 74a and shaft 75.

Also included is a switch arm 76 that is moved upward momentarily from fixed contact 76a each time the amount of production assigned for one time period, as determined by the production plan, is completed by the machine. As arm 76 moves upward, it strikes against one end of a pivotally supported arm 76b which causes the other end thereof to move downwardly and momentarily engage fixed contact 76c. When this occurs, it will be seen from the drawing that solenoid winding 72 is energized for the brief period that arm 76b remains engaged with fixed contact 76c over a circuit which may be traced from the positive side of a power source over conductors 77, 78, arm 76b, contact 76c and conductor 79. Arm 76b is otherwise maintained in the position shown in Fig. 2 by spring 81.

Also associated with the working machine is another switch arm 82 that is closed when the machine is operating and open when it is shut down. The arrangements by which switch arms 76 and 82 are actuated by the machine have not been illustrated since these will vary for different types of machines and are well within the skill of an artisan in this field.

A further component of the switching mechanism associated with each machine includes a relay 83 having two sets of contacts 83a, 83b. The winding 83c of this relay is connected via conductor 91 to fixed contact 76a and is energized during the time that arm 76 is engaged with this contact.

When relay 83 is energized, the set of contacts 83a are electrically connected by conductive bridge 83d to thereby close a circuit between the two coupled arms 70, 71 of the step relay. When relay 83 is deenergized, the other set of contacts 83b are electrically connected by bridge 83d to thereby connect arm 71 via conductor 80 to the positive side of a source of current designated by conventional symbol through a current interrupter device 84 which includes contacts 85 that are opened and closed at a comparatively slow rate by projections 86 on a disc 87 that is rotated by motor 88.

For indicating on and off conditions of the machine, there is provided a relay 92 having two sets of contacts 92a, 92b. The coil 92c for this relay is connected via conductor 93 and switch arm 82 to the positive side of a source of power. Thus when the machine is operating and switch arm 82 is accordingly closed, relay 92 is energized to close a power circuit through its set of contacts 92a and conductor 89 to signal lamp 32 on the front of panelboard 10. When the machine is out of operation and switch arm 82 is open, relay 92 is deenergized and thus closes a power circuit through its other set of contacts 92b and conductor 90 to the adjacent signal lamp 31 on panelboard 10.

As previously explained, operating characteristics of the machine may also be permanently recorded. Thus each machine may be provided with two recording pens 95, 96 that are actuated by coils 95a, 96a respectively.

Coil 95a is energized from a power source whenever switch arm 82 is closed, this coil being connected via conductor 94 into the same circuit as relay winding 92c, and the pen 95 thus traces the line 25 on moving chart 27 which is visible through window 28 on panelboard 10 to record the fact that the machine is in operation. Whenever the machine is stopped, coil 95a becomes deenergized, and pen 95 shifts transversely to thereby likewise displace the recorded trace 25.

Coil 96a is energized from a power source during the time that switch arm 76 is engaged with contact 76a, this coil being connected via conductor 98 into the same circuit as relay winding 83c, and thus pen 96 traces the line 26 on chart 27 to record this condition. Now, whenever the machine completes the preselected amount of production and switch arm 76 moves upwardly, coil 96a is deenergized and pen 96 is jogged transversely on chart 27 to record this fact.

The master switch 33 which is advanced periodically with time is electrically interconnected with the step relay 69 that is advanced periodically in accordance with actual production of the machine in such manner that when machine production is in step with planned production, the lamps 16 in the vertical lamp bank 14 on panelboard 10 representing that machine receive in succession "steady" power. But when machine production either lags or leads the planned production schedule, lamps 16 receive flickering power. This is accomplished by connecting the outgoing lines 58—63 in succession to successive contacts of the contact set 70a of the step relay 69 that periodically advances contactor arms 70, 71 one step each time that the machine completes the amount of production preplanned for the production period, and by connecting the contacts of contact set 71a in succession via conductors 101—106 to the lamps 16.

As illustrated, the machine is working in the second period of production and the production program is likewise in the second period. Hence machine production agrees with planned production and the second lamp in the lamp column 14 is illuminated "steadily" over a circuit that may be traced from conductor 57, contact 35c, contactor arm 35a, conductor 59, the second contact element on contact set 70a, contactor arm 70, relay contacts 83a, contactor arm 71, the second contact of contact set 71a and conductor 102 to the second lamp 16 from the top in column 14.

If machine production is not in agreement with planned production, for example the machine is lagging and still working in the first period of production, arms 70 and 71 would then be on the first contacts of contact sets 70a and 71a, respectively, and hence the top lamp 16 of the lamp row 14 would receive "flickering" power from the current interrupter 52 via conductor 51, contact segment 34b, contact arm 34a, conductor 58, the first contact on contact set 70a, contactor arm 70, relay contacts 83a, contactor arm 71, the first of the contacts on contact set 71a and conductor 101.

If machine production were to be leading the planned production, the third lamp 16 in row 14 would be similarly supplied with flickering power.

As the machine completes an amount of production planned for one period of time, switch arm 76 is tripped for a brief period causing relay coil 72 to become energized and step contactor arms 70, 71 to the next contact position. Also for the period that switch arm 76 is disengaged from contact 76a, relay 83 is deenergized and the source of slowly flickering power from contacts 85 of the current interrupter 84 is completed to the next lower lamp 16 via relay contacts 83b to thus indicate this fact to the supervisor.

In order to initially synchronize the switch mechanisms, a manually operated push button switch 107 may be associated with step relay 69 to step it around independently of operation of the switch 76 controlled by the machine.

While the switching mechanism 68 for only one working machine has been illustrated, the other machines in the group being supervised would be provided with similar switch mechanisms and these would be similarly connected to the outgoing lines 58—63 of the master switch mechanism 33.

Fig. 3 illustrates a modified construction for the switching mechanism actuated as a function of the actual production of the machine to light the lamps of the time periods of one time section plus a few more in the preceding time section and a like number in the next following time section, as distinguished from the Fig. 1 arrangement where the lamps for only one time section are illuminated. In Fig. 3, the time section 18' has been illustrated as comprising ten time periods with an overlap of three time periods each in the last and next time sections 18a', 18b' to permit a maximum time differential between several machines (from a viewpoint of production) of not more than four time periods.

Instead of two switch arms as provided in the step relay 69 of Fig. 2, the step relay 69' has four coupled arms 120—123 that are stepped up one contact at a time each time that relay winding 72' is energized. The fixed contacts 120a are connected to incoming lines 124 from the output of the switching mechanism associated with the planned production; it would be similar to the mechanism shown within the block 33 in Fig. 2 and hence has not been illustrated. The control for periodic energization of relay winding 72' in accordance with actual production of the machine would likewise be similar to that shown in Fig. 2 and is therefore also not shown here.

The fourth to the seventh fixed contacts (from the top down) of contact set 121a are connected to the signal lamps in boxes numbered 4 to 7 of the middle time section 18'; the first and last three contacts of set 122a are connected, respectively, to the signal lamps in boxes numbered 1 to 3 of the middle time section 18' and signals 8 to 10 of the preceding time section 18a'; and the first and last three fixed contacts of set 123a are connected, respectively to signal lamps in boxes numbered 1 to 3 of the next time section 18b' and lamps in boxes numbered 8 to 10 of the middle time section 18'.

Arms 120 and 121 are interconnected via conductors 125, 126, switch 127 and relay contacts 83a', these being closed when relay winding 83c' is energized in the same manner as relay winding 83c in Fig. 2. The other set of relay contacts 83b' connect via conductor 128 to a source of power through a current interrupting device of the same construction as interrupter 84 of Fig. 2 and which has therefore been omitted for the sake of simplicity.

Switch arms 120 and 122 are connected through relay contacts 83a' and a single pole, double throw switch 129 when its blade 129a engages fixed contact 129b. Switch arms 120 and 123 are similarly connected when blade 129a is thrown to engage contact 129c.

With the arrangement in Fig. 3, if not all of the machines are producing at exactly the rate set up by the program, the supervisor must be able to carry over to a newly starting time section, a visual indication of any machine whose production does not agree with the program. This, he accomplishes by actuating the switch 129. For example, if the machine is behind at the end of the tenth period of a time section, such that it is then only in its eighth period of production, switch blade 129a can then be thrown to contact 129b to transfer the visual indication from the eighth box in time section 18′ to the 8th box in section 18a′.

If the machine should happen to be ahead of scheduled production at the end of a time section, for example the lamp is lit in box "3" of section 18b′, then when the light in the "time" column is switched back to indicate the first time period of a new time section, switch blade 129a can also be thrown to contact 129b to transfer visual indication to box "3" of section 18′.

If the machine is running according to schedule, switch blade 129a remains in contact with contact 129b throughout the indications for the first seven time periods of a time section but must be thrown to contact 129c to get the proper indications for the last three time periods. When a new time section begins, switch arm 129a is thrown back into engagement with contact 129b and the visual indication cycle is thus repeated.

An embodiment of the invention which affords a continuous indication of the relationship between the actual and the planned production of a plurality of machines is illustrated in Figs. 4 and 5. The panelboard 10′ is divided vertically into ten columns which each denote a machine, and each column is made up of twelve boxes 15′ which represent successive time periods during which each machine is scheduled to produce a preselected number of articles or a preselected length of web material, for example paper, wallboard or textile fabrics. The panel surface is of translucent or transparent material, and lamps 16′ in the several boxes 15′ are energized (but only one at a time in each column) in accordance with the actual production of the machines. Pairs of signal lamps 31′, 32′ are located below each column and controlled, as described with reference to Fig. 2, to indicate whether or not the machines are in operation. Push knobs 140 are arranged below the pairs of signal lamps for manual operation, as will be described later, when the machines complete the preselected volume of work for one time period. The lamps 16′ of each column are energized in succession, as in the previously described forms of the invention, as the several machines complete the work scheduled for successive time periods.

The panelboard 10′ is also provided with luminous strips 141a which supplement the step-by-step indications of the lamps 16′ by visual indications of the accumulated output or performance of each machine with respect to its scheduled output. A measuring instrument 141 and lamp 141b control the color display on the luminous strips 141a, the associated network for determining the color presentation in accordance with the relation between elapsed time and actual production being shown in Fig. 5. The full length of each strip 141a is illuminated by "white" light when the associated machine is operating on schedule, but more or less of each strip appears in color when the machine production lags or leads the preselected output for the elapsed time. The voltage which is impressed upon the moving coil 141d of the measuring instrument is derived from two voltage dividers, one voltage divider being continuously adjusted on a time basis and the other being adjusted in accordance with the actual production of the associated machine. The rates of voltage change at the two voltage dividers are constant and equal so long as the machine maintains its scheduled rate of production, but the significant voltages drawn from the voltage dividers for "comparison" by the measuring instrument depart from equality when the machine output lags or leads the scheduled production.

Referring now to Fig. 5, the switching mechanism actuated in accordance with the production plan for the machine is comprised of a ring type voltage distributing resistor or potentiometer 142 connected at its end terminals to a source of voltage indicated by the usual symbols, and divided into three equal sections 142a, 142b and 142c. Three equally spaced arms 143 are mounted on shaft 144 for rotation as a unit in the direction shown, by a synchronous motor 145 through reduction gearing (not shown) to wipe over the segments of resistor 142 at a rate established in accordance with the planned production or work.

The switching mechanism actuated in accordance with production of the machine is comprised of a ring type voltage dividing resistor or potentiometer 146 that is connected across the intermediate section 142b of resistor 142 by conductors 147, 148. A contact arm 149 is rotated over the resistor 146 in accordance with the production of the associated machine, and the moving coil 141d of instrument 141 is connected between the contact arm 149 and one of the rotating contact arms 143 of the "scheduled production" resistor 142, as will be described in detail hereinafter. The contact arm 149 starts at one end of the resistor 146 at the beginning of a time period and is advanced clockwise to make one full rotation as the machine performs the work scheduled for the time period.

A circuit for visually indicating the completion of the scheduled work is momentarily energized by a switch arm 151 which is pivotally mounted for actuation by the contact arm 149 as it completes a full rotation, the switch arm 151 being thus momentarily rocked into engagement with a contact 151a. The circuit extends from the positive side of a power source, through the switch 151, 151a, a lead 152, and the winding 153a of a relay 153. On energization of relay 153, the double bridge contacts 153b are engaged with the front contacts 153c and the holding circuit contacts 153d respectively. The positive terminal of the holding contacts is connected by a jumper to one of the back contacts 153e through which direct current is normally supplied for the steady illumination of the lamp 141b which is associated with the measuring instrument. On energization of the relay 153, the front contacts 153c connect the lamp 141b to the current source through a switch 154 which is opened and closed cyclically by a cam 155 driven by a motor 156.

The illumination at the panel 141a is changed from a steady to a flickering illumination at the completion of a unit quantity of work, and the supervisor then depresses the associated pushbutton 140 to open the single pole, double throw switch 157 in the holding circuit of the relay 153. The relay armature drops out to reclose its back contacts, thereby supplying steady current to lamp 141b upon the release of the pushbutton.

As noted above, the color display on the several luminous strips 141a changes in accordance with the relative magnitudes of two voltages which vary with scheduled production and actual production, respectively, and which are compared by the instrument 141. The staff of the instrument carries an arcuately shaped transparent or translucent band 158 which is divided into three sections 158a, 158b and 158c which transmit "red," "white" and "green" light, respectively. The moving coil 141d is connected to the arm 149 of resistor 146 by a lead 161, and to the rotating arms 143 of the resistor 142 through a lead 162 and a three-point switch 163 comprising a switch arm 163a and contacts 163b connected to the several rotating arms 143 of the voltage divider 142. The switch arm 163a is moved counterclockwise, step-by-step, by successive energizations of a solenoid 163c upon shifting of switch 157 by the manually operated pushbutton 140.

The circuit arrangements for effecting the successive energization of the several lamps 16' of a column includes a contact arm 164 on the staff of instrument 141 and a contact 164a which is connected through lead 165 to a stepping switch 166, which controls the energization of the individual leads 167 to the several lamps 16'. The stepping switch includes a solenoid 166a having an armature 166b carrying a pawl 166c cooperating with ratchet wheel 166d on shaft 166e of the switch arm 166f which sweeps over contacts 166g.

The voltage drop across the moving coil 141d of instrument 141 is abruptly shifted by one-third the source value when the contact arm 149 moves from one end to the other of resistor 146 upon the completion of the scheduled work for one time period, and the moving coil 141d is thereby displaced angularly to close the contact arm 164 on contact 164a to energize the stepping switch to light the next lamp 16'. This abrupt displacement of the moving coil 141d moves the "red" section 158a of the band 158 into line with the lamp 141b, and this adjustment of the band 158 would normally indicate a lag in production. At the same time, however, the rotating arm 149 moves the switch arm 151 into engagement with contact 151a to energize the relay 153 and thereby supply a pulsating current to the lamp 141b. The flickering illumination of the light strip advises the supervisor that the machine has completed a preselected unit volume of work and that the pushbutton 140 should be depressed to advance the three-point switch 163 one step and to restore a steady current supply to the lamp 141b.

Upon advancing the switch 163 one step, the return connection 162 from the instrument 141 is made to a voltage point on the resistor 142 which is less than the previous return voltage by one-third the source voltage. The circuit connections are thus re-established for a comparison of voltages representing scheduled production and actual production.

For any given operating period of the machine, if machine production agrees with planned production, the contactor arm 149 will be driven at such an angular rate that it completes one revolution for each one-third revolution of the contactor arms 143. Further, the relative angular positions of arms 149 and 143 are initially so selected that under the aforesaid condition of operation, the voltage taken off arm 149 opposes and is always equal in magnitude to the voltage taken off that one of the arms 143 which is then connected to switch arm 163a. Thus no current flows through coil 141d of the "zero center" instrument 141 and the band 158 occupies a central position with respect to lamp 141b such that nothing but "white" light appears in the light strip 141a.

Should machine production lag the planned production, the voltage on arm 149 will no longer be equal to that at switch arm 163a and hence current will flow through coil 141d in such direction as to cause band 158 to turn counterclockwise and bring a portion of the "red" band section 158a into view at the top of the light strip 141a. The length of the red section seen in the strip will vary with the amount of unbalance in voltage and hence will be representative of the extent that the machine is lagging in production. Should machine production lead the planned production, the unbalance in voltage between arm 149 and switch arm 163a is reversed and hence band 158 turns clockwise to display a portion of the "green" section 158c at the bottom of the light strip 141a.

These two conditions of lag and lead for different machines might appear as shown, respectively, by strips 141a' and 141a'' in Fig. 4.

In Fig. 6, application of the invention is made to an arrangement for supervising traffic in a subway transit system. In this embodiment, the track system is reproduced on a panelboard and, as illustrated, comprises two double track lines 175, 176 with stations therealong designated by the small, substantially square areas and track blocks by the larger elongated areas. Each track block and station could be represented on the panelboard by an indicator of the luminous image type. The departure and travel times of the different trains are checked continuously, and switching devices actuated respectively in accordance with time and with the traffic plan to be maintained are provided. Also in certain cases, switches actuated as trains pass selected control points will have to be provided. Thus for example, if the dispatching of a train at station 177 has been very greatly delayed, red blinking light would appear. Too long a stay in block section 178 would likewise be indicated by red blinking light. A slight delay of trains at stations 179, 180 and track blocks 181, 182 would be indicated by a steady red light in each of these areas.

In the arrangement shown in Fig. 6, necessary different types of indications for each station and track section may be obtained by switching to different lamps or by using indicators of the general type shown in Fig. 5. If the latter type are used, the amount of the delays and thus the deviation in actual traffic flow from a predetermined traffic program can be expressed by the length of the colored image.

In Fig. 7, the invention is applied to a panelboard type of supervision for an assembly line, the sections of which are represented on the board in the form of areas adapted to be illuminated.

Areas designated by numerals 184—190 denote feeder sections to the main assembly line 191. A delay of material or parts in any of the feeder sections, such as in sections 186, 187, would be indicated by a red warning light. Areas designated by numerals 192—196 correspond to storage points and too great a reduction in stock at any of these points such as that represented by area 195 would be indicated by red blinking light.

A slight delay at the lower end 191' of the main assembly line 191 would be indicated by a red light while on greater delay, the red light here might change from steady to blinking.

In conclusion, it is to be understood that while preferred constructions of the invention have been shown and described, various changes and modifications may occur to those skilled in the art and may be made without departing from the spirit and scope of the appended claims.

I claim:

1. In a system for supervising the operation of a working machine and the like, means producing a first potential variable in accordance with time, means producing a second potential variable in accordance with the progress of said machine, circuit means connecting said potentials in opposition, and an electrical measuring instrument connected in said circuit means and which includes a moving system displaceable in accordance with the extent of the unbalance between said potentials.

2. A supervisory system as defined in claim 1 wherein said potentials become unbalanced to a predetermined maximum upon completion of a unit of progress of said machine and further including, a row of light signals each indicative of a unit of progress of said machine, and means controlled by the moving system of said instrument for illuminating said signals in succession.

3. In a system for supervising the operation of a working machine and the like, means deriving a first potential that varies with time, means producing a second potential that varies with production of said machine, circuit means connecting said potentials in opposition, and instrument means connected in said circuit means for indicating the sense and magnitude of any unbalance between said potentials.

4. A supervisory system as defined in claim 3 wherein said instrument means is of the luminous band type comprising a light strip, a light source, and a multi-colored band between said strip and source and which is displaceable with respect to said light strip in accordance with the difference between said potentials.

5. In a visual system for observing actual progress of a device such as a working machine and the like as compared with a predetermined plan of operation as related to time, a pair of potentiometers, time controlled means advancing one of said potentiometers, machine progress controlled means advancing the other potentiometer, circuit means connecting said potentiometers in opposition, and a visual signal device connected in said circuit means, said signal device including an indicator movable from a center zero position in accordance with the direction and magnitude of current in said circuit means.

6. An observation system as defined in claim 5 wherein said signal device comprises a measuring instrument including a light source, a light strip, and a multi-colored band located between said strip and source and which is displaceable with respect to said light strip to alter the color of one part of the latter when said current flow is in one direction and to alter the color of another part of said strip when said current flow is in the opposite direction.

EGBERT von MÜLINEN.

REFERENCES CITED

The following references are of record in the file of this patent:

UNITED STATES PATENTS

| Number | Name | Date |
| --- | --- | --- |
| 1,614,257 | Scheffler | Jan. 11, 1927 |
| 1,888,486 | Boedtcher | Nov. 22, 1932 |
| 1,999,810 | Hershey | Apr. 30, 1935 |
| 2,422,240 | Jackes | June 17, 1947 |